Figure 1:
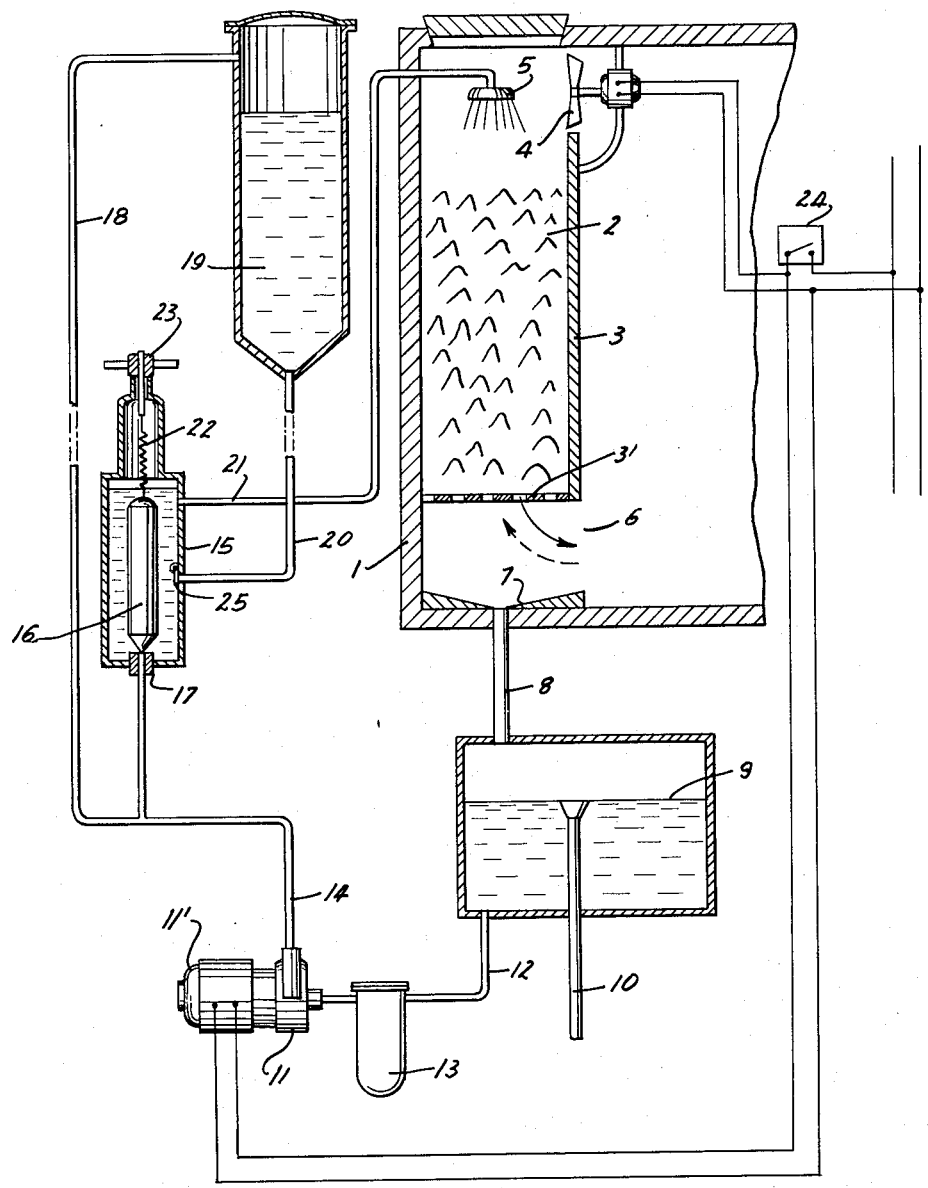

June 19, 1956        T. E. SCHMIDT        2,750,754
APPARATUS FOR REFRIGERATION BY MEANS OF AQUEOUS SOLUTIONS
Filed Feb. 11, 1952        2 Sheets-Sheet 1

INVENTOR:
Thomas Emil Schmidt
BY: Michael S. Striker
agt.

United States Patent Office 2,750,754
Patented June 19, 1956

2,750,754

APPARATUS FOR REFRIGERATION BY MEANS OF AQUEOUS SOLUTIONS

Theodor Emil Schmidt, Ettlingen, Baden, Germany

Application February 11, 1952, Serial No. 271,006

Claims priority, application Germany February 12, 1951

7 Claims. (Cl. 62—2)

The present invention relates to a method and apparatus for refrigeration, and more particularly to a method and apparatus for keeping the concentration of a solution used in a refrigerating arrangement constant.

It is known to use a temperature drop caused by contact of ice with aqueous solutions of certain substances, such as natrium chloride, calcium chloride, magnesium chloride or salt mixtures for refrigeration purposes. Instead of salts, acids may be used for such refrigeration arrangements. If, for instance, natrium chloride is added to ice, a brine is formed, and if sufficient amounts of the salt are added, temperatures as low as 21° C. are reached. At this temperature, solid salt, as well as a eutectic solution and ice are present.

The melting ice dilutes the solution, and according to the known methods such diluted solution is drained, and water formed by further melting of the ice is again saturated with salt, as long as solid salt is present. After the solid salt has been dissolved completely, further melting of the ice dilutes the solution to an undesired degree, and consequently the temperature rises. In larger refrigerating systems the temperature even rises before the solid salt is used up. In such refrigerating arrangements rather large blocks of ice are provided, and consequently insufficient contact with the salt is established. Also, salt is often rinsed off by the water formed by melting ice. Consequently part of the ice is not used, and new salt has to be added.

This is a disadvantage which is particularly noticeable in refrigerating arrangements for railway refrigerating cars carrying large loads which have to be kept cold while the railway car remains closed for many hours, and even days during which time adding of salt is not possible.

It is the object of the present invention to overcome the disadvantages of the known methods, and to provide a refrigeration method, and an apparatus which permit a fully automatic operation of a refrigerating arrangement.

It is another object of the present invention to apply a suitable temperature-reducing concentrated aqueous solution to ice in a refrigerating arrangement and to keep the concentration of such solution constant.

It is a further object of the present invention to circulate an aqueous solution of salt through ice pieces, and to provide an apparatus for automatically adding a higher concentrated solution to the circulating solution whenever the concentration of the circulating solution drops below a predetermined level.

It is a still further object of the present invention to interrupt the circulation of the solution when the temperature in the refrigerated area drops below a predetermined level.

It is a still further object of the present invention to alternately permit direct return of the solution to the ice if the concentration thereof is above a predetermined level, and to bring the solution into contact with a concentration-increasing substance when the concentration of the solution drops below a predetermined level.

It is also an object of the present invention to check the specific weight of the circulating solution in order to determine the concentration thereof.

It is a further object of the invention to provide a floating body in a container through which the circulating solution passes, and to provide a valve operated by the floating body for returning the solution to the ice either directly or after having been in contact with a concentration-increasing substance.

With these objects in view the present invention mainly consists in a refrigeration method comprising in combination the steps of circulating a solution of a substance which consumes heat while dissolving in water over the surface of ice pieces while part of the ice is converted into water and the solution is diluted; and adding to the circulating solution a higher concentrated solution whenever the specific weight, and the concentration of the circulating solution drops below a predetermined level due to dilution with the water formed by melting ice.

In carrying out this method an apparatus may be used which comprises in combination a container; outlet means on the container for delivering a liquid; first supply means supplying to the container a liquid of varying specific weight; second supply means supplying to the container a liquid having a higher specific weight than the varying specific weight of the liquid supplied by the first supply means; and operating means actuated by the specific weight of the liquid in the container, such operating means stopping supply of the liquid by the first supply means and starting supply of the liquid by the second supply means when the specific weight of the liquid decreases below a predetermined specific weight.

A refrigeration system according to the present invention comprises preferably container means containing ice; a first container; outlet conduit means connecting the first container with sprinkler heads arranged above the ice in the container means; first inlet conduit means connecting the first container with the lower portion of the container means so that the concentration of an aqueous solution circulating through the first container and the container means is reduced by contact with the ice melting in the container means; a second container containing a substance for increasing the concentration of the aqueous solution; a second inlet conduit means connecting the lower portion of the second container with the first container and supplying to the latter a highly concentrated aqueous solution from the second container; conduit means connecting the first container with the upper portion of the second container; pump means producing a hydraulic pressure in the first inlet conduit means higher than the hydraulic pressure in the second inlet conduit means and in said outlet means; valve means mounted in the first container intermediate the interior of the same and the first inlet conduit means; and a floating body movably mounted in the first container and operatively connected to the valve means and actuating the same.

The specific weight of the floating body conforms to the specific weight of a solution having a desired concentration, and according to a preferred embodiment the arrangement is such that the floating body closes the valve means whenever the specific weight and the concentration of the aqueous solution circulating through the first container, and the container means drops below a predetermined level. When the valve means are closed, the circulating solution is forced by the pump means into the second container where its concentration is increased by contact with the concentration-increasing substance therein whereupon it returns to the first container and passes from there through the outlet conduit means to the upper portion of the container means from where it is sprinkled on the ice to the container means. After being diluted by contact with the ice the solution is pumped to the first container.

A temperature-responsive device may be provided in the room cooled by the refrigerating system, and the motor which drives the pump may be switched off by a contact actuated by the temperature-responsive device.

Figure 2:
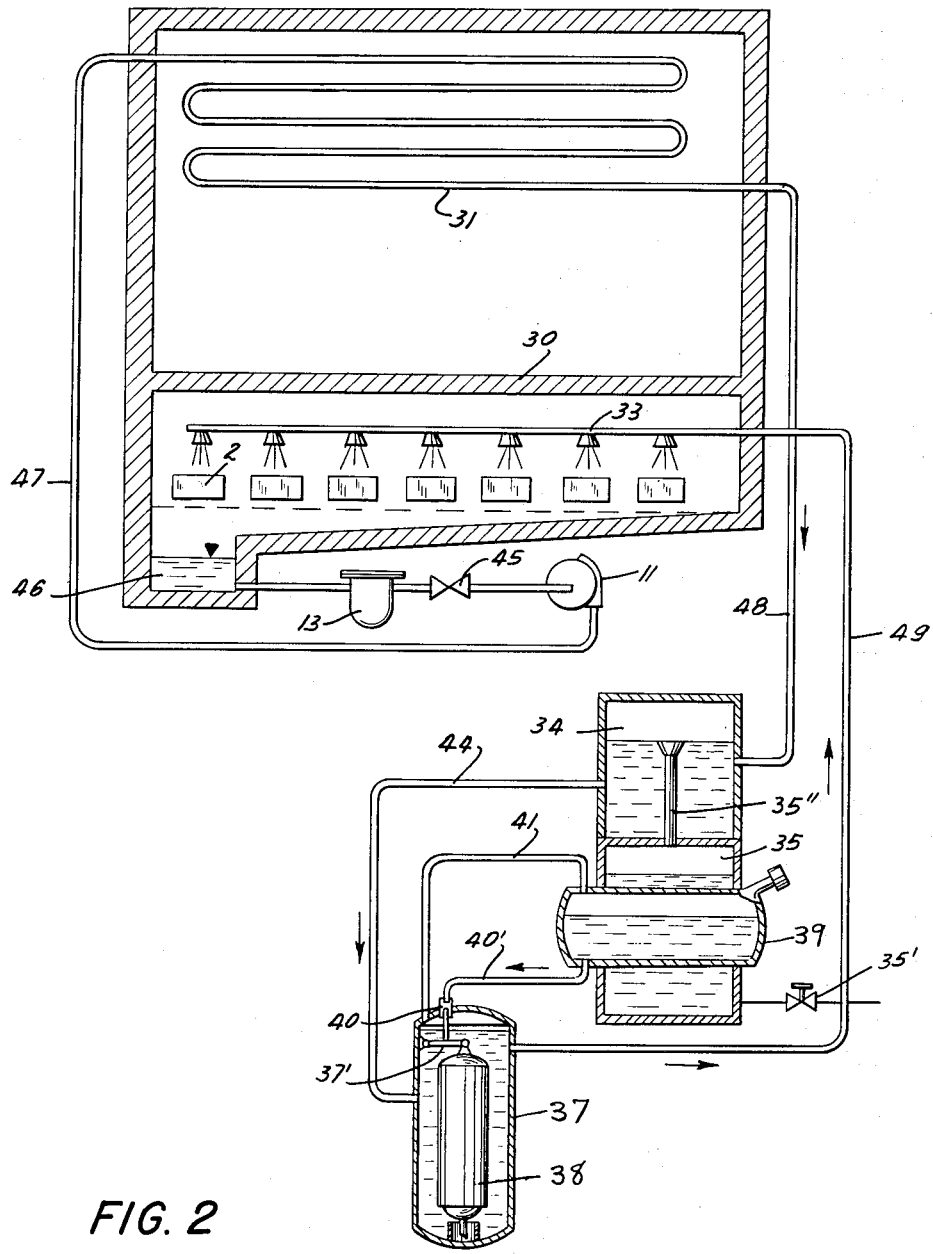

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic elevational view of a preferred embodiment of the present invention; and Fig. 2 is a schematic elevational view of another embodiment of the present invention.

Referring now to the embodiment illustrated in Fig. 1 of the drawings, an insulating wall 1 contains the space 20 to be cooled. Ice 2 is supported in the container means 3 on a perforated bottom plate 3'. Air is circulated by a fan 4 through the ice blocks 2 which are sprinkled through the sprinkler head 5 with a highly concentrated solution, for instance a highly concentrated solution of salt. The solution passes through the ice blocks and is diluted by water formed by melting ice. The diluted solution is gathered in a pan 7 and flows through the pipe 8 into a collecting container 9. The air may be circulated in the same direction as the solution or in opposite direction.

In the collecting container 9 a drain pipe 10 is provided which determines the level in container 9. Pump means 11 which are driven by electromotor 11' draw the liquid out of container 9 through a conduit 12 and a filter 13 and press the diluted solution through the inlet conduit portion 14 into the first container 15, or through the conduit means 18 into the upper portion of the second container 19, the lower portion of which is connected to the first container 15 by an inlet conduit means 20. The pan 7, the pipe 8, the container 9, the conduit 12, and the inlet conduit portion 14 constitute first inlet conduit means connecting the container means 3 with the first container 15. The pump means 11 serves as a means for producing in the portion 14 of the first inlet conduit means a higher hydraulic pressure than in the second inlet conduit means 20.

A floating body 16 is movably mounted in the container 15 and actuates valve means 17 to close and open, respectively, the inlet conduit portion 14. The position of the floating body 16 depends on the specific weight and on the concentration of the solution contained in container 15, and the arrangement is such that the floating body 16 opens the valve 17 when the specific weight, and the concentration of the solution is above a predetermined level. The solution passes through the container 15 and the outlet conduit 21 to the sprinkler head 5, whereupon the cycle is repeated.

In the event, however, that the concentration of the solution, and thereby its specific weight, is lowered by dilution, the floating body sinks, and closes the valve 17, so that the pump 11 forces the solution through conduit 18 into the container 19 in which salt is provided for increasing the concentration of the solution. The contact with the salt in container 19 results in a higher concentration of the solution, which passes through the inlet conduit means 20 into the container, increasing the concentration of the solution contained therein, until the higher specific weight of the solution in container 15 effects upward floating of the floating body 16 whereby valve 17 is opened. Since the level in the container 19 is higher than the sprinkler head 5, the solution passes through outlet conduit 21 and is sprinkled over the ice. As soon as the concentration of the solution in container 15 exceeds a predetermined limit the floating body 16 opens again valve 17 and the solution passes directly through the valve 17 into the container 15 and from there into the outlet conduit 21. A check valve 25 is provided at the second inlet conduit means 20 connecting the second container 19 with the first container 15 in order to prevent that the solution is pressed into container 19 when the valve 17 is open.

The concentration of the solution may be varied by providing an adjustment means for the floating body 16 for changing the buoyancy of the floating body. In the embodiment illustrated in Fig. 1, the spring 22 on which the floating body is suspended may be adjusted by a nut and bolt means 23 to compensate part of the weight of the floating body.

Since the temperature of the mixture of ice and brine in the container 3 depends on the concentration of the solution, an automatic temperature control is achieved by the above-described apparatus. The container 3 may be provided with a mixture of ice and salt and the operation of the apparatus may be started when the salt contained in container 3 has been used up. It is, however, also possible to supply the apparatus according to the present invention with ice only and to start a circulation of the aqueous solution immediately.

As soon as the desired temperature is reached in the cooled area, the circulation of the liquid may be interrupted until the temperature in the vicinity of the container 3 again exceeds a predetermined maximum temperature. A temperature-responsive device 24 is provided for this purpose. This device 24 includes contact means which are connected into the circuit of the electric motor 11' driving the pump 11 so that the pump motor 11' may be switched off automatically when the temperature is sufficiently low whereby the circulation of the solution through container 15, outlet conduit 21, and sprinkler head 5 is interrupted.

The temperature-responsive device 24 may also be connected into the circuit of the electric fan 4 and interrupt circulation of the air through the ice as long as the temperature is sufficiently low.

If, for instance, calcium chloride is used in the solution and the temperature of $-10°$ C. is desired in the refrigerated area, the ice in container 3 must be kept at a temperature of $-15°$ C. In order to obtain this temperature, the concentration of the aqueous solution of calcium chloride is kept constant at 18.5% corresponding to a temperature of $-16°$ C. As a result of the formation of water by the melting of ice, the solution is diluted and contains only 16.5% calcium chloride resulting in a temperature of the diluted solution of $-14°$ C. so that an average temperature of $-15°$ C. is obtained.

Fig. 2 illustrates a modified embodiment of the present invention according to which the diluted solution is employed in an intermediate cooling system. The diluted solution accumulates in the basin 46. Pump 11 sucks the diluted solution from basin 46 through filter 13 and valve 45, and presses the solution through the inlet conduit 47 into a cooling coil 31 which cools the room 30. The diluted solution passes from the cooling coil through a conduit 48 into the container 34 and from there through an inlet conduit 44 into the container 37. Container 37 is provided with outlet conduit means 49 ending in sprinkler head 33 arranged over the ice 2.

Similar to the embodiment shown in Fig. 1, a floating body 38 is provided in the container 37 and operates a valve 40' at the end of the inlet conduit 40' which connects a container 39 with the container 37. A conduit 41 is provided to equalize the pressure in containers 37 and 39. Below the collecting container 34 a further container 35 is provided which is in contact with the wall of container 39 and cools the solution contained therein. The container 35 is provided with a drain pipe 35" projecting into container 34 and determining the level of the liquid therein, while in the outlet of the container 35 a valve 35' is provided.

This arrangement operates as follows:

The valve 35' is closed during normal operation of the apparatus and the containers 34, 35, 37 and 39 are under the same pressure when the pump 11 operates. As long as the liquid contained in container 37 is sufficiently highly concentrated, the specific weight of the floating body 38 is lower than the specific weight of the liquid and the floating body closes valve 40 by means of lever 37'. Consequently, the liquid circulates from basin 46, pump 11, cooling coil 31, conduit 48, container 34, inlet conduit 44, container 37 and outlet conduit 49 to the sprinkler head 33, and accumulates again in the basin 46.

In the event, however, that the concentration of the liquid drops below a predetermined level, its specific weight is lowered and the floating body sinks, opening valve 40. This permits a highly concentrated solution in container 39 to enter through conduit 40 into the container 37, increasing the concentration therein until the floating body closes valve 40 again. From time to time the surplus amount of solution accumulating in container 35 is drained off by opening valve 35'. The arrangement according to the embodiment shown in Fig. 2 is preferably employed when acids are used in the solution.

In addition to the cooling of the highly concentrated solution in container 39 by means of the diluted solution in container 35, the low temperature of the solution in basin 46 may be exploited in a different manner. It may for instance be advantageous to cool the solution supplied by the concentration apparatus by the diluted solution accumulating in the basin 46 which has a much lower temperature. For this purpose the solutions may be arranged flowing in a countercurrent.

It will be understood that each of the elements described above, or two or more together, may also find a useful application in other types of refrigerating methods and apparatus differing from the types described above.

While the invention has been illustrated and described as embodied in an apparatus and method for keeping constant the concentration of a liquid which, when brought into contact with ice reduces the temperature to a degree depending on the concentration of the solution, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A refrigeration system, comprising, in combination, container means adapted to contain ice; a first container; outlet conduit means connected at one end thereof to said first container and at the other end thereof to the upper portion of said container means, and adapted to supply an aqueous solution contained in said first container to the ice contained in said container means; first inlet conduit means connected at one end thereof to said first container and at the other end thereof to the lower portion of said container means, and adapted to supply to said first container an aqueous solution the concentration of which has been reduced by contact with the ice in said container means; a second container adapted to contain a substance for increasing the concentration of the aqueous solution; a second inlet conduit means connected at one end thereof to said first container and at the other end thereof to the lower portion of said second container and adapted to supply to said first container an aqueous solution contained in said second container; conduit means connecting a portion of said first inlet conduit means located adjacent said first container, and thereby said first container with the upper portion of said second container and adapted to convey an aqueous solution to said second container, the concentration of said aqueous solution being increased by contact with the substance contained in said second container while said aqueous solution passes through said second container from said upper portion thereof to said lower portion thereof; hydraulic means located in said first inlet conduit means and producing in said portion of said first inlet conduit means a hydraulic pressure higher than the hydraulic pressure in said second inlet conduit means; valve means mounted in said first container intermediate the interior of the same, and one of said inlet conduit means; and a floating body movably mounted in the interior of said first container and operatively connected to said valve means for actuating the same, said floating body being adapted to move in accordance with the concentration of the aqueous solution in said first container so that said one of said inlet conduit means is closed by said valve means when the concentration of the aqueous solution in said container and the specific weight thereof differ from predetermined amounts.

2. A refrigeration system, comprising, in combination, container means adapted to contain ice; a first container; outlet conduit means connected at one end thereof to said first container and at the other end thereof to the upper portion of said container means, and adapted to supply an aqueous solution contained in said first container to the ice contained in said container means; first inlet conduit means connected at one end thereof to said first container and at the other end thereof to the lower portion of said container means, and adapted to supply to said first container an aqueous solution the concentration of which has been reduced by contact with the ice in said container means; a second container adapted to contain a substance for increasing the concentration of the aqueous solution; supporting means supporting said second container at a higher level than said first container; a second inlet conduit means connected at one end thereof to said first container and at the other end thereof to the lower portion of said second container and adapted to supply to said first container an aqueous solution contained in said second container; conduit means connecting a portion of said first inlet conduit means located adjacent said first container, and thereby said first container with the upper portion of said second container and adapted to convey an aqueous solution to said second container, the concentration of said aqueous solution being increased by contact with the substance contained in said second container while said aqueous solution passes through said second container from said upper portion thereof to said lower portion thereof; pump means in said first inlet conduit means producing in said portion of said first inlet conduit means a hydraulic pressure in said first inlet conduit means higher than the hydraulic pressure in said second inlet conduit means; a collecting container in said first inlet conduit means arranged intermediate said container means and said pump means; a drain pipe projecting into said collecting container and having an open upper end determining the liquid level therein; filter means arranged in said first inlet conduit intermediate said collecting container and said pump means; valve means mounted in said first container intermediate the interior of the same, and said portion of said first inlet conduit means; and a floating body movably mounted in the interior of said first container and operatively connected to said valve means for actuating the same, said floating body being adapted to move in accordance with the concentration of the aqueous solution in said first container so that said first inlet conduit means is closed by said valve means when the concentration of the aqueous solution in said container and the specific weight thereof drop below predetermined amounts.

3. A refrigeration system, comprising, in combination, container means adapted to contain ice; a first container; outlet conduit means connected at one end thereof to said first container and at the other end thereof to said container means, and adapted to supply an aqueous solution contained in said first container to the ice contained in said container means; first inlet conduit means connected at one end thereof to said first container and at the other end thereof to said container means, and adapted to supply to said first container an aqueous solution the concentration of which has been reduced by contact with the ice in said container means; a second container adapted to contain a substance for increasing the concentration of the aqueous solution; supporting means for said containers supporting said second container at a higher level than said first container; a second inlet conduit means connected at one end thereof to said first container and at the other end thereof to said second container and adapted to supply to said first container an aqueous solution contained in said second container; conduit means connecting a portion of said first inlet conduit means located adjacent said first container, and thereby said first container with said second container and adapted to supply an aqueous solution to said second container, the concentration of said aqueous solution being increased by contact with the substance contained in said second container while said aqueous solution passes through said second container from said upper portion thereof to said lower portion thereof; pump means in said first inlet conduit means producing in said portion of said first inlet conduit means a hydraulic pressure higher than the hydraulic pressure in said second inlet conduit means; electric motor means driving said pump means; a temperature-responsive contact means located in the vicinity of said ice-containing container means, and connected to said electric motor means for starting the same when the temperature in said vicinity exceeds a predetermined level; valve means mounted in said first container intermediate the interior of the same and said portion of said first inlet conduit means; and a floating body movably mounted in the interior of said first container and operatively connected to said valve means for actuating the same, said floating body being adapted to move in accordance with the concentration of the aqueous solution in said first container so that said first inlet conduit means is closed by said valve means when the concentration and the specific weight of the aqueous solution in said container differ from predetermined amounts.

4. A refrigeration system, comprising, in combination, container means adapted to contain ice, said container means being formed with an inlet and an outlet; fan means blowing air through said inlet into said container means so that the air passes through said container means and out of said outlet; electric motor means driving said fan means; a first container; outlet conduit means connected at one end thereof to said first container and at the other end thereof to the upper portion of said container means, and adapted to supply an aqueous solution contained in said first container to the ice contained in said container means; first inlet conduit means connected at one end thereof to said first container and at the other end thereof to said outlet in said container means, and adapted to supply to said first container an aqueous solution the concentration of which has been reduced by contact with the ice in said container means; a second container adapted to contain a substance for increasing the concentration of the aqueous solution; supporting means for said containers supporting said second container at a higher level than said first container; a second inlet conduit means connected at one end thereof to said first container and at the other end thereof to the lower portion of said second container and adapted to supply to said first container an aqueous solution contained in said second container; conduit means connecting a portion of said first inlet conduit means located adjacent said first container, and thereby said first container with the upper portion of said second container and adapted to supply an aqueous solution to said second container, the concentration of said aqueous solution being increased by contact with the substance contained in said second container while said aqueous solution passes through said second container from said upper portion thereof to said lower portion thereof; pump means in said first inlet conduit means producing in said portion of said first inlet conduit means a hydraulic pressure higher than the hydraulic pressure in said second inlet conduit means; electric motor means driving said pump means; a temperature-responsive contact means located in the vicinity of said ice-containing container means, and connected to said electric motor means for starting the same when the temperature in said vicinity exceeds a predetermined level; valve means mounted in said first container intermediate the interior of the same and said portion of said first inlet conduit means; a floating body movably mounted in the interior of said first container and operatively connected to said valve means for actuating the same, said floating body being adapted to move in accordance with the concentration of the aqueous solution in said first container so that said first inlet conduit means is closed by said valve means when the concentration and the specific weight of the aqueous solution in said container differ from predetermined amounts; and adjusting means for adjusting the buoyancy of said floating body to conform to a predetermined concentration and specific weight of said aqueous solution.

5. A refrigeration system, comprising, in combination, container means adapted to contain ice; a first container; outlet conduit means connected at one end thereof to said first container and at the other end thereof to the upper portion of said container means, and adapted to supply an equeous solution contained in said first container to the ice contained in said container means; first inlet conduit means connected at one end thereof to said first container and at the other end thereof to the lower portion of said container means; pump means arranged in said first inlet conduit means and adapted to supply to said first container an equeous solution, the concentration of which has been reduced by contact with the ice in said container means; cooling coil means in said first inlet conduit means arranged between said pump means and said first container; a collecting container arranged in said first inlet conduit means intermediate said cooling coil means and said first container; a draining container located underneath said collecting container; a drain pipe communicating with said draining container and projecting therefrom into said collecting container, said drain pipe having an open upper end determining the level of the aqueous solution in said collecting container; a second container surrounding said draining container and being cooled by the same, said second container adapted to contain a highly concentrated aqueous solution; a second inlet conduit means connected at one end thereof to said first container and at the other end thereof to the lower portion of said second container and adapted to supply to said first container a highly concentrated solution contained in said second container; conduit means connecting said first container with the upper portion of said second container and adapted to equalize the pressure in said first and said second container; valve means mounted in said first container intermediate the interior of the same and said second inlet conduit means; and a floating body movably mounted in the interior of said first container and operatively connected to said valve means for actuating the same, said floating body being adapted to move in accordance with the concentration of the aqueous solution in said first container so that said second inlet conduit means is closed by said valve means when the concentration and the specific weight of the aqueous solution in said first container exceed predetermined amounts, whereby flow of highly concentrated solution from said second container into said first container is stopped.

6. A refrigeration system, comprising, in combination, container means adapted to contain ice; a first container; outlet conduit means connected at one end thereof to said first container and at the other end thereof to the upper portion of said container means, and adapted to supply an aqueous solution contained in said first container to the ice contained in said container means; first inlet conduit means connected at one end thereof to said first container and at the other end thereof to the lower portion of said container means; pump means arranged in said first conduit means and adapted to supply to said first container an aqueous solution, the concentration of which has been reduced by contact with the ice in said container means; cooling coil means in said first inlet conduit means arranged between said pump means and said first container; a collecting container arranged in said first inlet conduit means intermediate said cooling coil means and said first container; a draining container located underneath said collecting container and having an outlet; a valve arranged in said outlet and adapted to close the same; a drain pipe communicating with said draining container and projecting therefrom into said collecting container, said drain pipe having an open upper end determining the level of the aqueous solution in said collecting container; a second container surrounding said draining container and being cooled by the same, said second container adapted to contain a highly concentrated aqueous solution; a second inlet conduit means connected at one end thereof to said first container and at the other end thereof to the lower portion of said second container and adapted to supply to said first container a highly concentrated solution contained in said second container; conduit means connecting said first container with the upper portion of said second container and adapted to equalize the pressure in said first and said second container; valve means mounted in said first container intermediate the interior of the same and said second inlet conduit means; and a floating body movably mounted in the interior of said first container and operatively connected to said valve means for actuating the same, said floating body being adapted to move in accordance with the concentration of the aqueous solution in said first container so that said second inlet conduit means is closed by said valve means when the concentration and the specific weight of the aqueous solution in said first container exceed predetermined amounts, whereby flow of highly concentrated solution from said second container into said first container is stopped.

7. A refrigeration system comprising, in combination, container means adapted to contain ice; a first container; outlet conduit means connected at one end thereof to said first container and at the other end thereof to the upper portion of said container means, and adapted to supply an aqueous solution contained in said first container to the ice container in said container means; first inlet conduit means connected at one end thereof to said first container and at the other end thereof to the lower portion of said container means, and adapted to supply to said first container an aqueous solution the concentration of which has been reduced by contact with the ice in said container means; a second container adapted to contain a substance for increasing the concentration of the aqueous solution; a second inlet conduit means connected at one end thereof to said first container and at the other end thereof to the lower portion of said second container and adapted to supply to said first container an aqueous solution contained in said second container; conduit means for connecting said first container with the upper portion of said second container and adapted to convey an aqueous solution to said second container, the concentration of said aqueous solution being increased by contact with the substance contained in said second container while said aqueous solution passes through said second container from said upper portion thereof to said lower portion thereof; hydraulic means located in said first inlet conduit means for producing in said first inlet conduit means a positive hydraulic pressure; valve means mounted in said first container intermediate the interior of the same and one of said inlet conduit means; and a floating body movably mounted in the interior of said first container and operatively connected to said valve means for actuating the same, said floating body being adapted to move in accordance with the concentration of the aqueous solution in said first container so that said one of said inlet conduit means is closed by said valve means when the concentration of the aqueous solution in said container and the specific weight thereof differ from predetermined amounts.

References Cited in the file of this patent

UNITED STATES PATENTS

| | | |
|---|---|---|
| 1,040,739 | Nilsson | Oct. 8, 1912 |
| 1,118,583 | Richert | Nov. 24, 1914 |
| 1,168,743 | Richert | Jan. 18, 1916 |
| 2,226,954 | Thorold | Dec. 31, 1940 |
| 2,590,269 | Pike | Mar. 25, 1952 |